(12) United States Patent
Cathcart

(10) Patent No.: US 8,688,329 B2
(45) Date of Patent: Apr. 1, 2014

(54) AUTOMATIC HATCH CLOSER FOR MARINE VESSELS AND RECREATIONAL VEHICLES

(76) Inventor: Bruce C. Cathcart, Mystic, CT (US)

( * ) Notice: Subject to any disclaimer, the term of this patent is extended or adjusted under 35 U.S.C. 154(b) by 367 days.

(21) Appl. No.: 13/137,770

(22) Filed: Sep. 12, 2011

(65) Prior Publication Data

US 2012/0072034 A1   Mar. 22, 2012

Related U.S. Application Data

(60) Provisional application No. 61/344,694, filed on Sep. 15, 2010.

(51) Int. Cl.
*B60R 22/00* (2006.01)

(52) U.S. Cl.
USPC ............... 701/49; 701/21; 700/282; 49/21

(58) Field of Classification Search
USPC ............ 701/21, 45, 49; 700/282; 49/21, 349, 49/506
See application file for complete search history.

(56) References Cited

U.S. PATENT DOCUMENTS

| 4,042,193 | A | * | 8/1977 | Cerne | 244/129.1 |
| 4,133,576 | A | * | 1/1979 | Chrysler | 296/218 |
| 4,210,277 | A | | 7/1980 | Kolt | |
| 5,067,277 | A | | 11/1991 | Magalotti | |
| 5,231,948 | A | * | 8/1993 | Malmanger et al. | 114/201 R |
| 6,427,384 | B1 | * | 8/2002 | Davis, Jr. | 49/255 |

OTHER PUBLICATIONS

UFLEX S.r.l.; Linear actuators/hatch lifters; pp. 1-8; www.ultralflexgroup.it.
AutoAdapt of Sweden; pneumatic hatch opener; www.autoadapt.com.

* cited by examiner

*Primary Examiner* — Gertrude Arthur Jeanglaude
(74) *Attorney, Agent, or Firm* — Breiner & Breiner, L.L.C.

(57) ABSTRACT

An automatic hatch system is disclosed. The system includes a hatch frame and a hatch cover connected thereto. A pneumatic actuator assembly is connected to the hatch frame and the hatch cover. The system also includes an automated member for controlling the pneumatic actuator assembly to open, close or adjust the opening of the hatch. The automated member for controlling the pneumatic actuator includes a compressor assembly, a valve assembly, and a controller assembly.

20 Claims, 6 Drawing Sheets

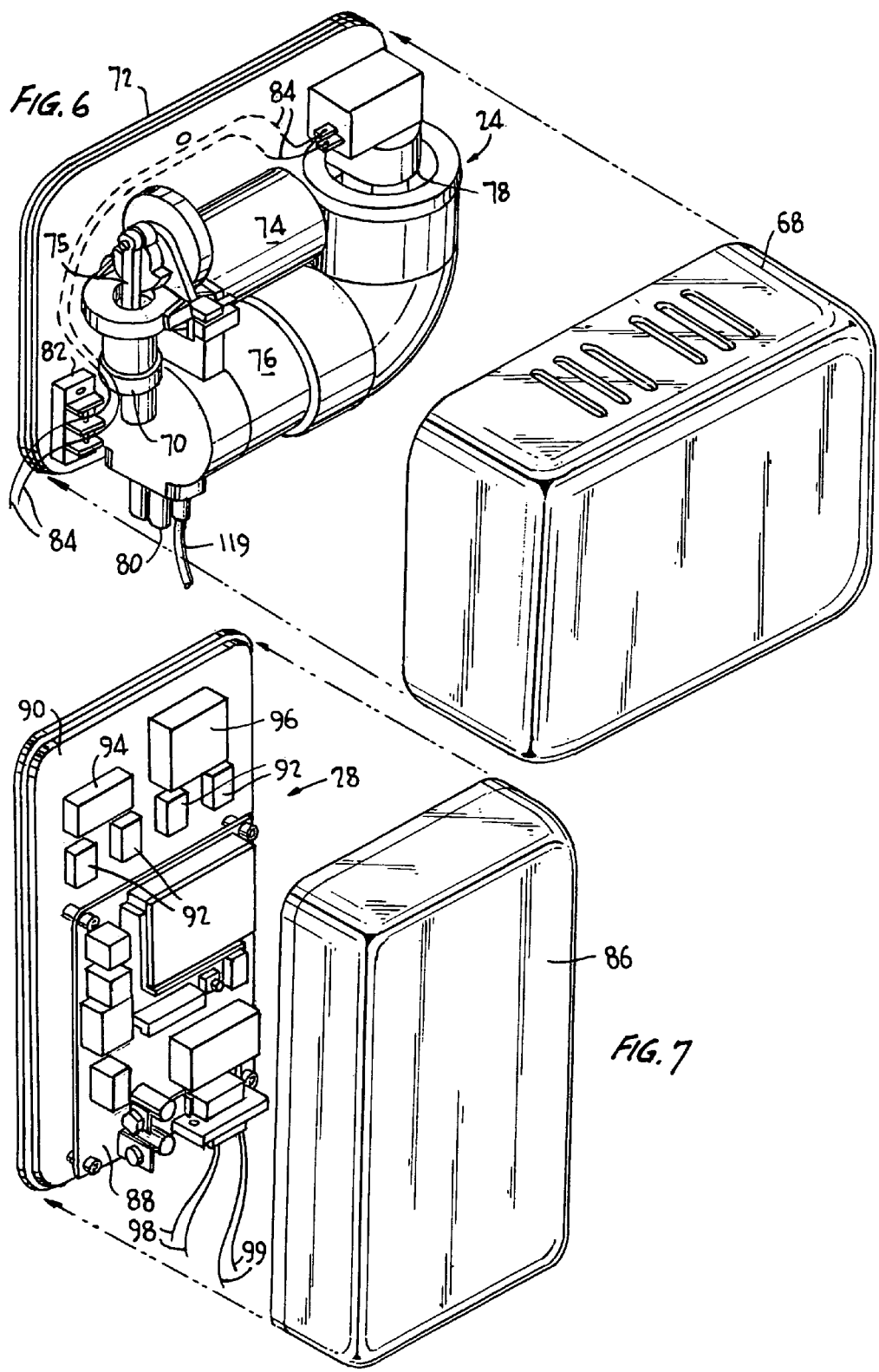

United States Patent

AUTOMATIC HATCH CLOSER FOR MARINE VESSELS AND RECREATIONAL VEHICLES

RELATED APPLICATIONS

This application claims benefit of U.S. provisional application Ser. No. 61/344,694, filed Sep. 15, 2010, entitled AUTOMATIC HATCH CLOSER FOR MARINE VESSELS AND RECREATIONAL VEHICLES, and incorporated herein by reference in its entirety.

FIELD OF INVENTION

This invention relates to hatches used on marine vessels and recreational vehicles and specifically to devices used to automatically open, close, and maintain positions of these hatches.

BACKGROUND OF INVENTION

Hatches have been used for many years in marine vessels and recreational vehicles to provide ventilation to the interiors. Although there are many types and styles of hatches marketed today, one common configuration utilizes a hinge on one side of the opening and one or more latches usually placed opposite the hinge. Many hatches include a means for maintaining the position of the hatch lid in a fully or partially open position.

While it is generally agreed that hatches accomplish their purpose of improving ventilation, this new and novel invention improves their functionality by enabling users to operate them remotely or by providing a means to open and close hatches automatically as described below.

There are many instances when it is desirable to have the ability to open and close marine vessel hatches remotely or automatically. One example is when the operator of the vessel is alone and unable to leave the helm of a vessel to open a hatch to provide ventilation or to close it when rougher seas are encountered to prevent spray from entering the interior of the vessel. Larger or more elaborate vessels may have many hatches and the ability to open and close some or all of these hatches by pressing a single button would be quite desirable. Still another example of the usefulness of an automatic hatch would be if the user of the vessel desired to leave the vessel unattended with the hatches open, said hatches could be configured to close automatically based on various circumstances, including rain, an increase or decrease in temperature, or after a predetermined period of time.

Likewise, users of recreational vehicles will find it valuable to open or close hatches automatically for many of the same reasons that users of marine vessels do.

There are other examples of prior art that have used a powered means to open and close hatches. Uflex Group markets linear actuator designed to lift very large hatches (265 lbs/120 kg) that might prove too heavy for the average user to lift. The Uflex system and others like it utilize an electric motor and screw mechanism which is not suitable for common ventilation hatches because of their size, cost and complexity.

These systems also would not lend themselves to safe automatic operation of smaller ventilation hatches because the forces that they are capable of have the potential for personal injury.

U.S. Pat. No. 4,210,277 to Kolt recognized the value of automatically opening a hatch in a mobile home and describes a system that uses an expanding diaphragm to do so. Although this system responds to changes in temperature, it cannot be automatically opened and closed when desired by the user and it does not lend itself to reacting to other desirable parameters such as rain or the speed of the vehicle or vessel.

AutoAdapt of Sweden markets a pneumatic hatch opener for a "hatchback style automobiles". This system includes the safety advantage of using pneumatics but is not well suited for marine vessels because, among other things, it does not include a means for latching. The AutoAdapt also lacks a means for sensing other environmental factors such as heat or rain. The AutoAdapt system also does not have a means for controlling multiple hatches simultaneously.

Others, including U.S. Pat. No. 5,067,277 to Magalotti, have used pneumatic gas springs to assist users in opening hatches, but these systems still require manual operation.

Although these systems and others improve upon manual operation of hatches, each have shortcomings that this new and novel invention overcomes as described below.

SUMMARY OF INVENTION

The present invention provides for an apparatus and method for automatically opening and closing hatches, such as found on marine vessels and recreational vehicles. The invention provides for a simple and inexpensive apparatus and method for automatically opening and closing hatches.

The invention is further directed to an automatic hatch system. The system includes a hatch frame and a hatch cover connected thereto. A pneumatic or other fluid actuator assembly is connected to the hatch frame and the hatch cover. An automated means is provided for controlling the pneumatic or other fluid actuator assembly to open, close or adjust the opening of the hatch. The automated means may include a compressor assembly, a valve assembly, and a controller assembly.

These and other primary objects of the invention will be apparent from the following description of the preferred embodiments of the invention and from the accompanying drawings.

BRIEF DESCRIPTION OF THE DRAWINGS

FIG. 3 is a perspective view of the hatch assembly 10. A pneumatic actuator assembly 32 is connected to the hatch frame 14 and hatch cover 16 using a frame mounting bracket 34 and a cover mounting bracket 36. An actuator cover 38 is shown positioned over portions of the pneumatic actuator assembly 32. A latch lever 40 is attached to the hatch frame 16.

FIG. 6 is a perspective view of the compressor assembly 24 with a compressor cover 68 removed. A compressor 70 is mounted to a base plate 72. A motor 74 attaches to the compressor 70. An accumulator tank 76 is mounted to the base plate 72 and attaches to compressor 70. A pressure switch 78 attaches to the accumulator tank 76. A terminal block 82 attaches to the base plate 72. Wires 84 connect the terminal block 82 to the pressure switch 78 and the motor 74.

FIG. 7 is a perspective view of the electronic controller box 28 shown with the front housing 86 removed. A microcontroller board 88 is mounted to a base plate 90. Also attached to the base plate 90 are relays 92, a temperature sensor 94, and a wireless receiver 96.

REFERENCE NUMERALS

10 Hatch Assembly
12 Deck
14 Hatch Frame
16 Hatch Cover
18 Rain Sensing Device
19 Latching System
20 User Interface
22 Instrument Panel
24 Compressor Assembly
26 Valve assembly
28 Controller Assembly
30 Bulkhead
32 Pneumatic Actuator Assembly
34 Frame Mounting Bracket
36 Cover Mounting Bracket
38 Actuator Cover
40 Latch Lever
41 Ramp Feature
42 Pneumatic Cylinder
44 Cylinder Rod
46 Rod Clevis
48 Clevis Pin
50 Pneumatic Fittings
52 Cylinder Tubing
54 Latching Mechanism
56 Latch Slide
58 Slot
60 Slide Retainer
62 Air Cylinder
64 Slide Ramp
68 Compressor Cover
70 Air Compressor
72 Base Plate
74 Motor
75 Reciprocating Piston
76 Accumulator Tank
78 Pressure Switch
80 Pneumatic Fittings
82 Terminal Block
84 Wire
86 Front Housing
88 Microcontroller Board
90 Base Plate
92 Relay
94 Temperature Sensor
96 Wireless Receiver
98 Input Wires
99 Communication Wires
100 Top Cover
102 Rain Sensor Circuit Board
104 Bottom Cover
106 Printed Circuit
107 Cover Opening
108 Wire Lead
109 Drain
110 Top Cover
112 Electro-Pneumatic Shuttle Valve
114 Base Plate
116 Valve Body
117 Solenoid Wire
118 Solenoid
119 Supply Tubing
120 Flow Control Fittings
121 Pneumatic Fitting
122 Front Cover
124 Rocker Switch
126 Open Pushbutton
128 Close Pushbutton
130 Select Pushbutton
132 LCD Display
134 Base Plate

DETAILED DESCRIPTION OF THE PREFERRED EMBODIMENTS

Figure 1:
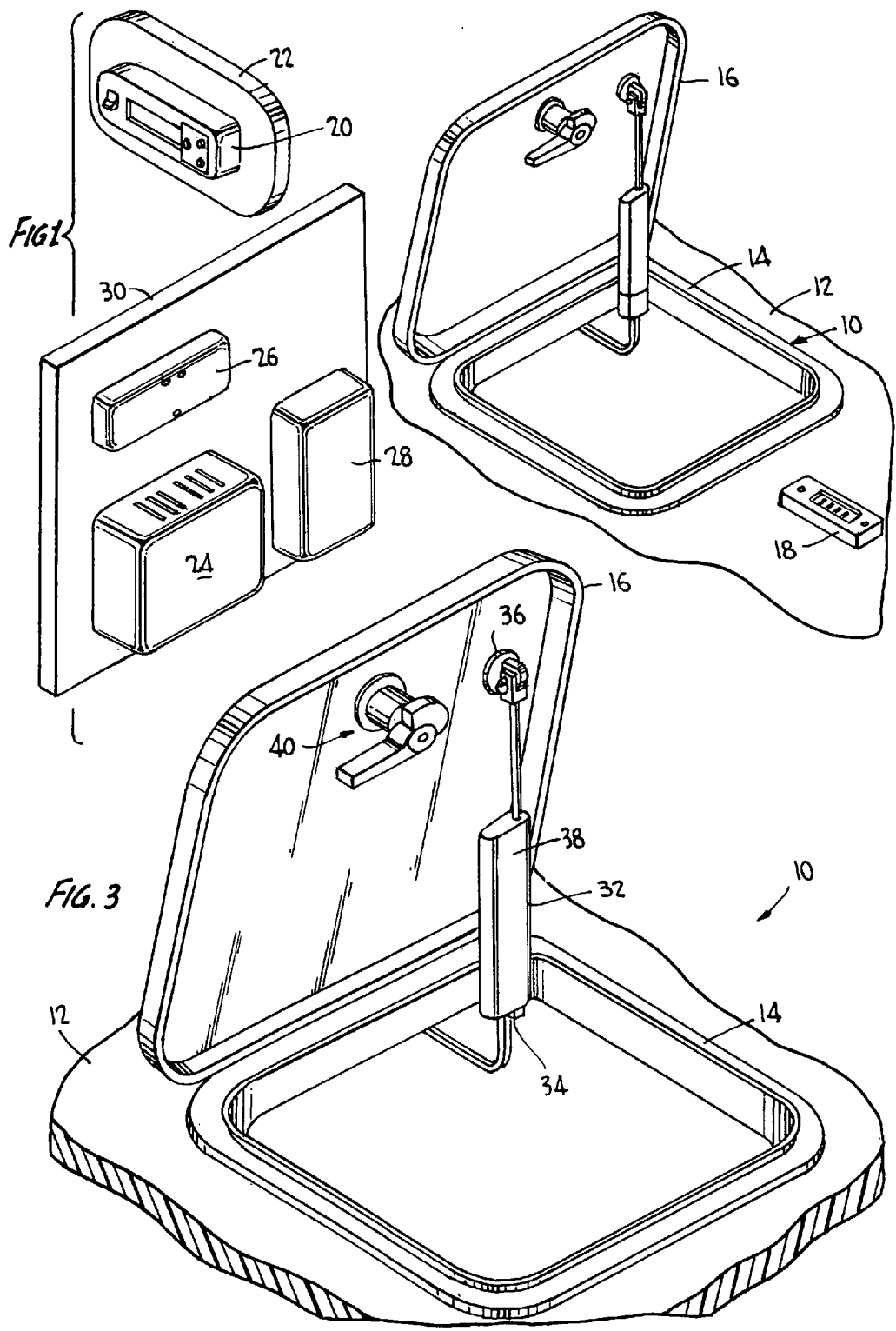
FIG. 1 is a perspective view of one embodiment of the automatic hatch closing system showing various components in a typical installation. A hatch assembly 10 is mounted into a cutout section of a deck 12. The hatch assembly 10 includes a hatch frame 14 and a hatch cover 16. A rain sensing device 18 is also shown mounted to the deck 12. A user interface 20 is shown mounted to an instrument panel 22. A compressor assembly 24, a valve assembly 26, and a controller assembly 28 are shown mounted to a bulkhead 30.
Figure 2:
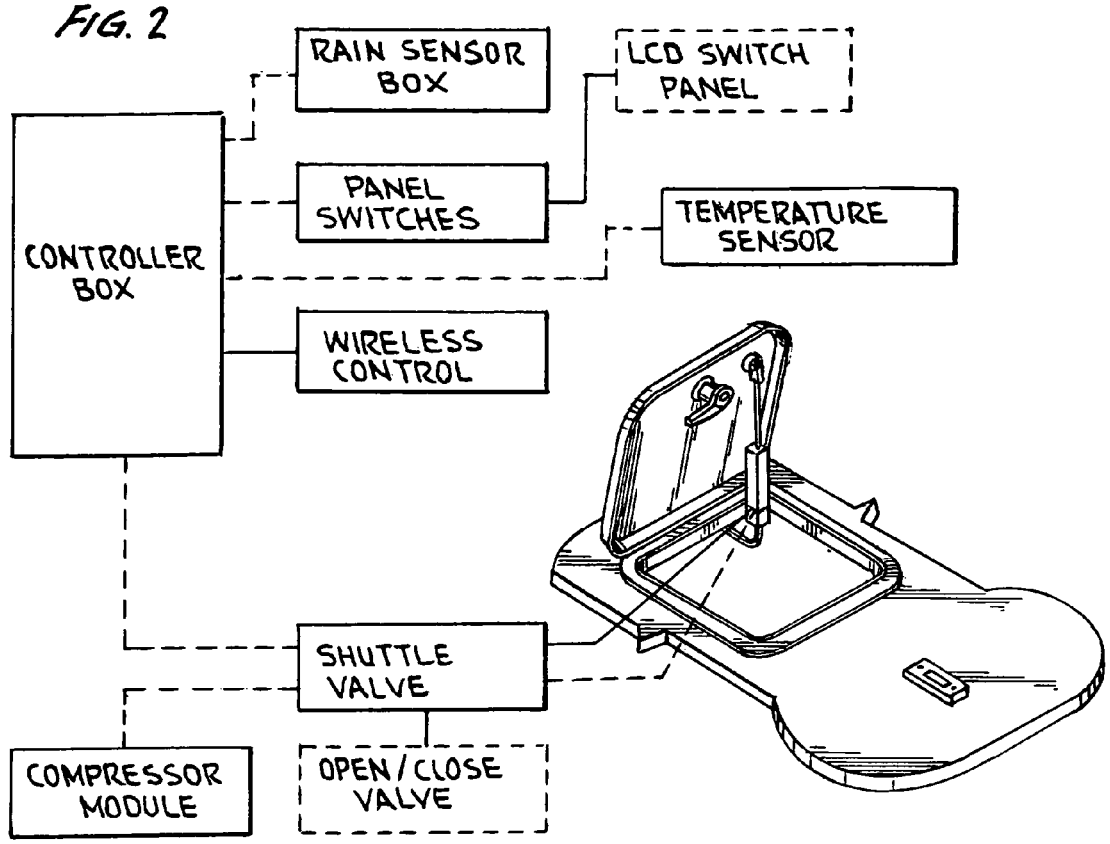
FIG. 2 is a schematic diagram of elements that comprise a typical installation of the automatic hatch assembly of the present invention.

The automatic hatch closing system is a modular assembly of components that are illustrated graphically in FIG. 1 and schematically in FIG. 2. The goal of this invention is to provide a means for remotely opening, closing, or positioning in an intermediate position the hatch cover 16 of a hatch assembly 10 by using a pneumatic actuator 32. It is understood by those skilled in the art that other fluid actuator assemblies may be used without departing from the scope of the invention such as hydraulic or nitrogen actuator systems.

Figure 4:
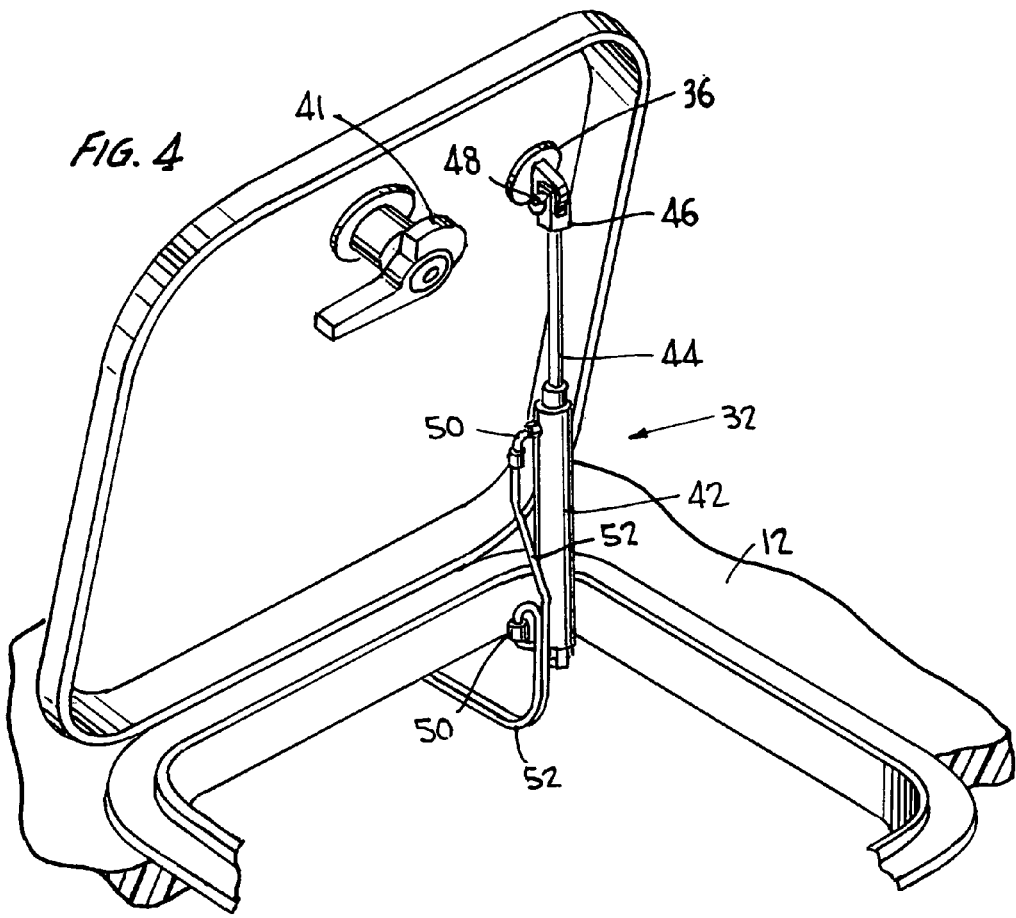
FIG. 4 is a close up perspective view of the pneumatic actuator assembly 32 with the actuator cover 38 removed. The pneumatic actuator assembly 32 comprises a pneumatic cylinder 42, a cylinder rod 44, and a rod clevis 46. A clevis pin 48 connects the rod clevis 46 to the cover mounting bracket 36. Pneumatic tubing 52 is pressed into pneumatic fittings 50 which are attached to the pneumatic cylinder 42.

FIGS. 3 and 4 show the pneumatic actuator assembly 32 mounted to the frame mounting bracket 34 which is mounted to the hatch frame 14. The pneumatic actuator assembly 32 includes a movable cylinder rod 44. A rod clevis 46 is attached to the end of the cylinder rod 44 and coupled to a cover mounting bracket 36 by a clevis pin 48. The cover mounting bracket 36 is mounted to the hatch cover 16. Two pneumatic fittings 50 are attached to the pneumatic cylinder 42. Tubing 52 is fitted into the pneumatic fittings 50. Compressed air introduced from elsewhere in the system into the pneumatic cylinder 42 through the pneumatic fittings 50 causes the cylinder rod 44 to extend or retract, thereby causing the hatch cover 16 to open or close. An actuator cover 38 is fitted over the pneumatic actuator assembly 32 to improve the appearance and protect the pneumatic fittings 50 and tubing 52.

Figure 9:
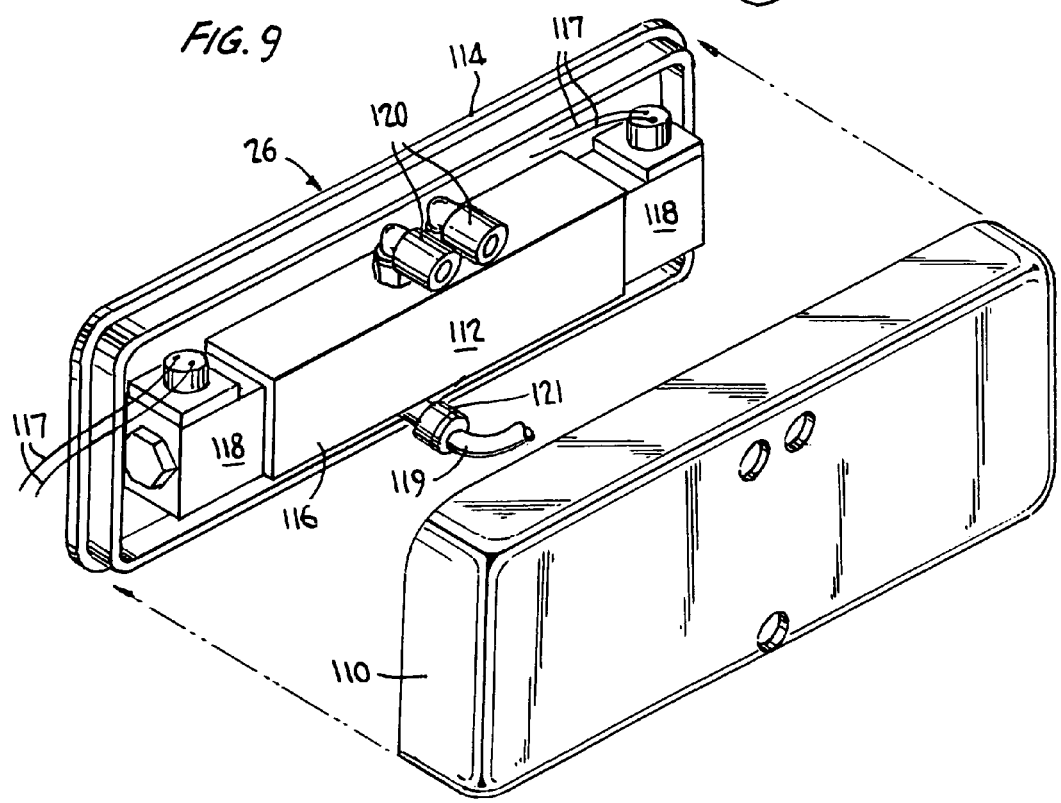
FIG. 9 is a perspective view of the valve assembly 26 shown with top cover 110 removed. The valve assembly 112 is mounted to a base plate 114 and includes a valve body 116, (2) solenoids 118 and (2) flow control fittings 120 and a pneumatic fitting 121.

In order for the pneumatic actuator assembly 32 to cause hatch cover 16 to move to the desired location compressed air must be supplied to the appropriate pneumatic fitting 50 by a valve assembly 26. FIG. 9 shows a detailed view of the preferred embodiment of the valve assembly 26. The primary component of the valve assembly 26 is an electro-pneumatic shuttle valve 112. These valves are commonly used in industry to control pneumatic circuits for example for automatic assembly machines. The electro-pneumatic shuttle valve 112 uses one or more solenoids 118, which are electromagnets, to move an internal valve within a valve body 116 to redirect air from the air supply tubing 119 to either of the two cylinder tubes 52. The preferred embodiment of the electro-pneumatic shuttle valve 112 incorporates 2 solenoids 118 that enable the internal valve within the valve body 116 to supply air to either of the cylinder tubes 52 or neither of them. This feature enables the cylinder rod 44 to be stopped at any position from fully retracted to fully extended and therefore enables the user to position the hatch cover at any desired position.

Flow control fittings 120 are attached to the valve body 116. The flow control fittings 120 are commonly used in industrial pneumatic applications to reduce the flow of compressed air by employing an internal needle valve to restrict the flow of air. Restricting the airflow through the cylinder tubing 52 and into the pneumatic cylinder 42 results in slower movement of the cylinder rod 44 and the hatch cover 16 which is desirable. Electrical power is supplied to the solenoid valves through solenoid wires 117 which are connected to the controller box 28 or other appropriate electrical source.

The electro-pneumatic shuttle valve 112 is mounted to a base plate 114. A top cover 110 protects the components within the valve assembly 26.

In the preferred embodiment of the invention compressed air is supplied to the air supply tubing 119 from a compressor module 24. FIG. 6 is a perspective view of the preferred embodiment of the compressor module 24. For clarity, the compressor cover 68 is shown removed to reveal the other components of the compressor assembly. The air compressor 70 is a known method of compressing air that utilizes a motor 74 to drive a reciprocating piston 75. Compressed air is stored in an accumulator tank 76. Electrical power is provided to the motor 74 through wires 84 connected to a terminal block 82. A pressure switch 78 is connected between the terminal block 82 and the motor 74 and is mounted into the accumulator tank 76 in order to sense the pressure within the accumulator tank. The pressure switch 78 is commonly known and is designed to make or break an electric circuit when it is subject to a preset pressure. In this embodiment, the pressure switch 78 will close the electric circuit and provide power to the motor 74 when the pressure within the accumulator is less than 80 lbs per square inch. One or more pneumatic fittings 80 are attached to the accumulator tank 76 and allow supply tubing 119 from one or more valve assemblies 26 to be connected.

In the preferred embodiment of the invention electrical power is supplied to the valve assembly 26 through solenoid wires 117 connected to a controller assembly 28. FIG. 7 is a perspective view of the controller assembly 28 shown with a front housing 86 removed. A microcontroller board 88 is mounted to a base plate 90. The microcontroller board 88 is commonly known and used in industry and is a programmable system to process signals from various input sources (inputs) and send signals to various devices (outputs). The microcontroller board 88 receives input signals through input wires 98. In the preferred embodiment the input wires are connected to a user interface 20 and a rain sensing device 18. Input signals may also be received from other devices mounted to the base plate 90 including a temperature sensor 94 and a wireless receiver 96. The microcontroller board 88 controls the movement of the hatch cover 88 by sending output signals to one or more relays 92 mounted to the base plate 90. Relays 92 are common in industry and are used to send power to the solenoid wires 117 and control one or more valve assemblies 26.

Figure 10:
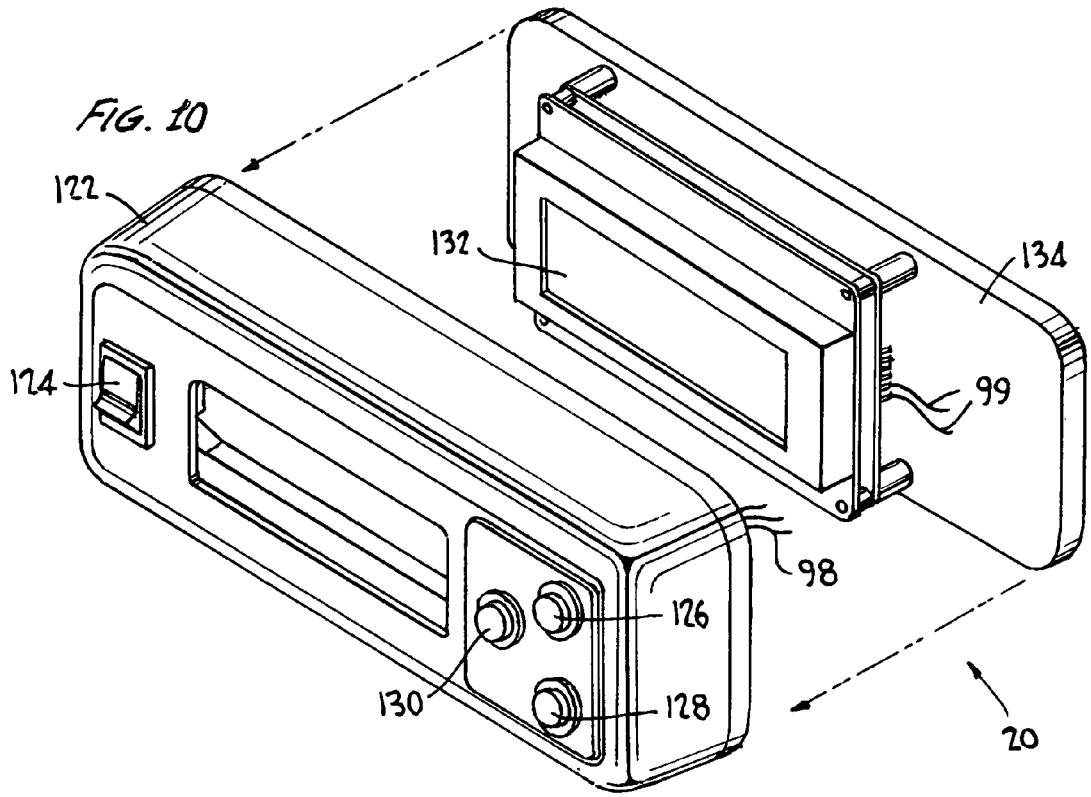
FIG. 10 is a perspective view of a user interface 20 shown with a front housing 122 removed. A rocker switch 124, an open pushbutton 126, a close pushbutton 128, and a select pushbutton 130 are mounted into the front housing 122. An LCD display 132 is mounted to a base plate 134.

The preferred embodiment of the user interface 20 is shown in perspective view in FIG. 10. For clarity, the front cover 122 is shown removed from the base plate 134. The user interface is electrically connected to the controller assembly 28 through input wires 98 and communication wires 99. The input wires 98 are connected to three momentary action pushbutton switches, an open pushbutton 126, a close pushbutton 128, and a select pushbutton 130, mounted into the front cover 122. A rocker switch 124 is mounted into the front cover 122 and is used to connect or disconnect the system to electrical power. A Liquid Crystal Display (LCD) 132 is mounted to the base plate 134 and is used to display text messages from the microcontroller board 88 through communication wires 99.

Although there are limitless ways to configure the user interface 20, operation of the preferred embodiment of the operation is as follows:

The automatic hatch closing system is powered on by switching the rocker switch to the "on" position. Upon power up, the microcontroller board 88 sends a text message to the LCD display 132 that reads "press select for options". Each time the user depresses the select pushbutton 130, the microcontroller board 88 sends a text message that corresponds to an option available in that particular users installation in a boat or recreational vehicle. For example, the following messages might be displayed on the LCD display 132 in sequence as the select pushbutton 130 is depressed: "ALL HATCHES"; "PORT HATCHES"; "STARBOARD HATCHES"; "FORWARD HATCHES"; "AFT HATCHES".

When the user is satisfied with the selection displayed on the LCD display 132, he/she presses the open pushbutton 126 to open the hatch(es) selected or the close pushbutton 128 to close the hatch(es) selected.

Figure 8:
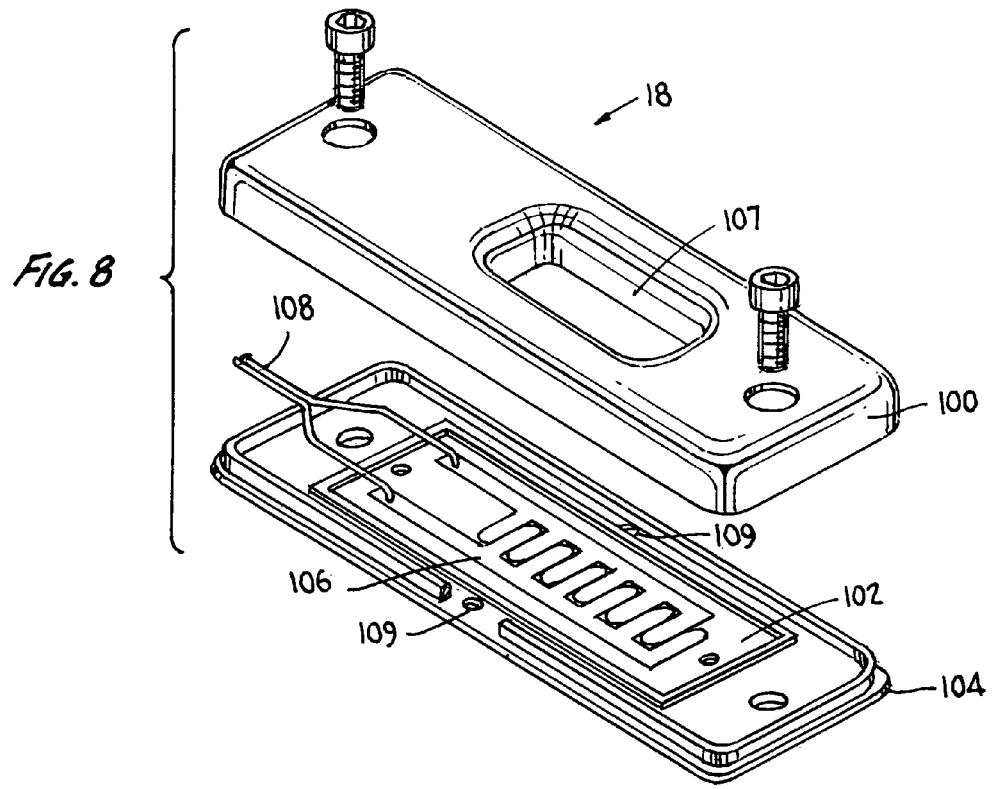
FIG. 8 is a perspective view of the rain sensor module 18 with a top cover 100 removed. A rain sensor circuit board 102 is attached to a bottom cover 104. The rain sensor circuit board 102 has an integral printed circuit 106 with wire leads 108 attached.

The preferred embodiment of a rain sensing device 18 is connected to the controller assembly 28 by a rain sensor lead 108. The rain sensing device 18 is shown in perspective view in FIG. 8 with a top cover 100 removed for clarity. A rain sensor circuit board 102 is mounted to a bottom cover 104 which is mounted to a deck 12 of a boat or some similar installation that would be exposed to rainfall. The rain sensor circuit board consists of 2 rows of printed circuit 106 traces that are separated by a small gap. Rain sensor wire leads 108 are soldered to the printed circuit 106. Top cover 100 is secured to the bottom cover 104 to protect the components of the rain sensing device 18. An opening 107 is provided in the top cover 100 that would allow the rain drops to contact the printed circuit 106. In the event of rain, water droplets bridge the gap between the printed circuit 106 traces and close a circuit in the microcontroller board 88. The microcontroller board 88 will subsequently send an output signal that will ultimately result in the hatch cover 16 closing. A drain feature 109 is included in the bottom cover 104 that prevents water from accumulating in the rain sensing device 18.

Figure 5:
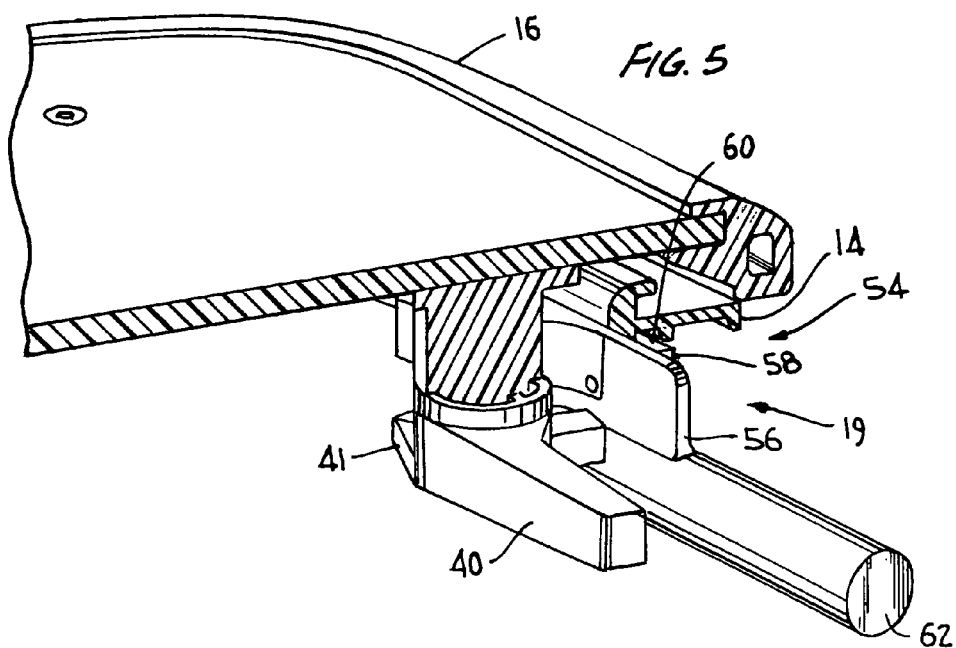
FIG. 5 is a sectioned perspective view of the latching mechanism 54. The latch lever 40 is shown attached to the hatch cover 16. A latch slide 56 is placed in a slot 58 of the hatch frame 14. A slide 60 is attached to the latch slide 56. An pneumatic actuator 62 is mounted to the deck 12 and attached to the latch slide 56.
Figure 5A:
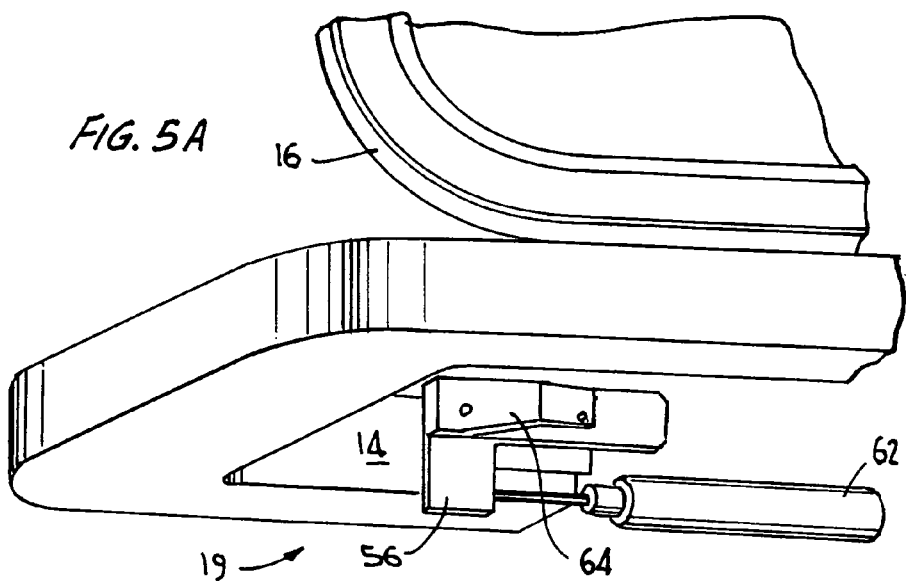
FIG. 5A is a perspective view of the latch system in the unlatched state shown with the hatch cover 16 open from the underside of the hatch. Some hatch detail is removed to illustrate the latch mechanism.
Figure 5B:
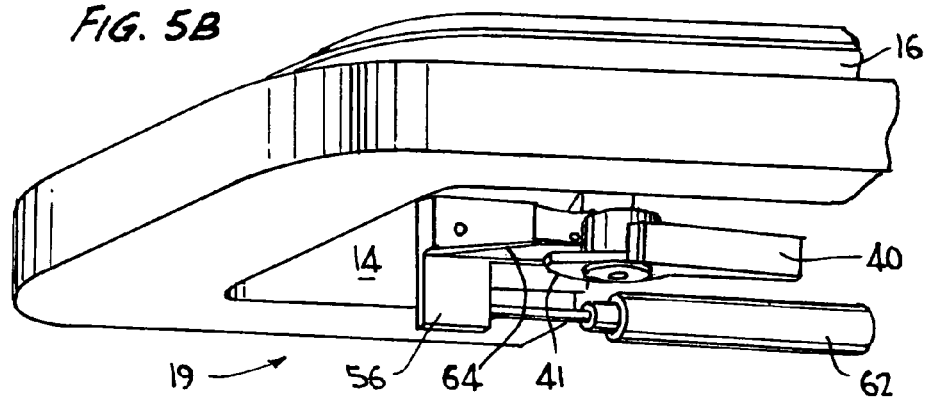
FIG. 5B shows the hatch cover 16 closed but not latched.
Figure 5C:
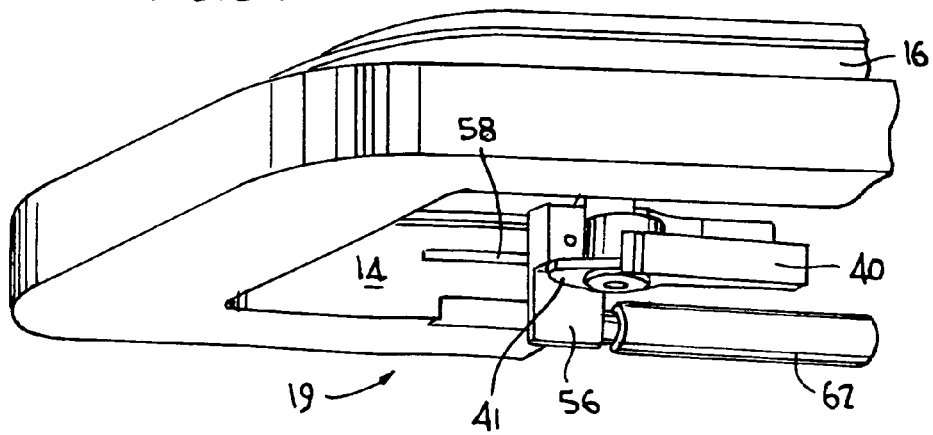
FIG. 5C shows the hatch cover closed and the latch system in the latched state.

Although the pneumatic actuator assembly 32 will maintain the hatch cover 16 in the closed position, it may be desirable to have a more positive latching system to keep the hatch cover 16 closed. An alternate embodiment of this invention utilizes a latching system 19 to positively maintain the hatch cover 16 in the closed position. Rotary latch levers 40 are well known in the marine industry. They usually incorporate a ramp feature 41 that contacts a fixed block such that as the rotary latch lever 40 is rotated the hatch is closed tightly. The latching system of this embodiment is shown in a sectioned perspective view in FIGS. 5-5c. The described embodiment utilizes the same latch lever 40 that is currently fitted to manual hatches but replaces the fixed block with a latch slide 56. A slot 58 is provided in the hatch frame 14 to provide a path for the latch slide 56 to travel. A slide retainer 60 is fitted behind the slot 58 and retains the latch slide 56 in the slot 58. An air cylinder 62 is attached to the latch slide 56 and mounted to the underside of the deck 12. The latch slide 56 has a ramp feature 64 that matches the ramp feature 41 on the latch lever 40. Latching system 19 of the hatch assembly 10 may be used in manual mode by simply rotating the latch lever 40 to release the hatch from the latch slide 56. The latching system 19 may also be used in automatic mode. To do so, the appropriate command is selected at the user interface 20. An input signal is sent to the controller assembly 28 which sends an output signal to a valve assembly 26 that corresponds to the air cylinder 62 of the latching system 19. The air cylinder 62 extends, thereby moving the slide retainer so that the slide ramp 64 no longer contacts the ramp feature 41 of the latch lever 40. Latching, in either manual or automatic mode is the reverse of the processes described above.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claim.

It is claimed:

1. An automatic hatch system comprising:
   a hatch frame and a hatch cover connected thereto;
   a fluid actuator assembly connected to said hatch frame and said hatch cover; and
   an automated means for controlling said fluid actuator assembly to open, close or adjust an opening of said hatch cover comprising a compressor assembly, a valve assembly, and a controller assembly.

2. The automatic hatch system of claim 1, wherein said fluid actuator assembly comprises:
   a pneumatic cylinder including a first end and a second end, wherein said first end attaches to said hatch frame;
   a movable cylindrical rod at said second end of said pneumatic cylinder; and
   a means for attaching said movable cylindrical rod to said hatch cover.

3. The automatic hatch system of claim 2, wherein said pneumatic actuator assembly further comprises:
   pneumatic fittings attached at said first end and said second end of said pneumatic cylinder; and
   a tubing attached to each of said pneumatic fittings.

4. The automatic hatch system of claim 1, wherein said compressor assembly comprises:
   an air compressor; and
   an accumulator tank attached to said air compressor wherein said accumulator tank stores compressed air therein.

5. The automatic hatch system of claim 4, wherein said compressor assembly further comprises:
   a motor connected to the air compressor, wherein said motor drives a reciprocating piston; and
   a pressure switch connected between said motor and said accumulator tank to sense pressure within said accumulator tank and provide power to said motor when pressure in said accumulator tank reaches a predetermined point.

6. The automatic hatch system of claim 1, wherein said valve assembly comprises:
   an electro-pneumatic shuttle valve with at least one solenoid which moves an internal valve within a valve body to direct air supply to said fluid actuator assembly.

7. The automatic hatch system of claim 1, wherein said controller assembly comprises:
   a microcontroller board which processes signals from predetermined input sources and sends signals to predetermined output sources.

8. The automatic hatch system of claim 1, further comprising at least one of a rain sensing device or a temperature sensor.

9. The automatic hatch system of claim 8, wherein said rain sensing device or said temperature sensor is connected to said controller assembly by a sensor lead.

10. The automatic hatch system of claim 8, wherein said rain sensing device comprises a circuit and an opening which allows rain drops to contact said circuit, wherein said rain sensing device sends a signal to said controller assembly.

11. The automatic hatch system of claim 1, further comprising:
    a user interface electrically connected to said controller assembly.

12. The automatic hatch system of claim 11, wherein said user interface comprises at least one of an open pushbutton, a close pushbutton, a select pushbutton or a liquid crystal display which displays messages from said controller assembly.

13. The automatic hatch system of claim 1, further comprising:
    a latch mechanism constructed and arranged to be opened manually or automatically.

14. The automatic hatch system of claim 13, wherein said latch mechanism comprises:
    a latch lever attached to said hatch cover;
    a latch slide operatively positioned in a slot in said hatch frame;
    a slide attached to said latch slide; and
    a pneumatic actuator attached to said latch slide and mounted to a deck of a vessel.

15. A method for automatically opening, closing, or maintaining a position of a hatch cover on a marine vessel or a recreational vehicle comprising:
    providing an automatic hatch system comprising:
       a hatch frame and a hatch cover connected thereto;
       a fluid actuator assembly connected to said hatch frame and said hatch cover; and
       an automated means for controlling said fluid actuator assembly to open, close or adjust an opening of said hatch cover comprising a compressor assembly, a valve assembly, and a controller assembly;
    sensing external weather conditions including rain or temperature; and
    opening, closing, or maintaining a position of said hatch cover according to said external weather conditions.

16. The method of claim 15, wherein said fluid actuator assembly comprises:
- a pneumatic cylinder including a first end and a second end, wherein said first end attaches to said hatch frame;
- a movable cylindrical rod at said second end of said pneumatic cylinder; and
- a means for attaching said movable cylindrical rod to said hatch cover.

17. The method of claim 16, further comprising:
- supplying compressed air to said valve assembly to move said hatch cover by said pneumatic actuator.

18. The method of claim 15, wherein said compressor assembly comprises:
- an air compressor;
- an accumulator tank attached to said air compressor, wherein said accumulator tank stores compressed air therein;
- a motor connected to the air compressor, wherein said motor drives a reciprocating piston; and
- a pressure switch connected between said motor and said accumulator tank to sense pressure within said accumulator tank and provide power to said motor when pressure in said accumulator tank reaches a predetermined point.

19. The method of claim 15, wherein said valve assembly comprises:
- an electro-pneumatic shuttle valve with at least one solenoid which moves an internal valve within a valve body to direct air supply to said pneumatic actuator assembly.

20. The method of claim 15, wherein said controller assembly comprises:
- a microcontroller board which processes signals from predetermined input sources and sends signals to predetermined output sources.

* * * * *